United States Patent [19]

Drake et al.

[11] 4,276,697

[45] Jul. 7, 1981

[54] COMPLIANCE ELEMENT FOR REMOTE CENTER COMPLIANCE UNIT

[75] Inventors: Samuel H. Drake, Lexington; Sergio N. Simunovic, Newton, both of Mass.

[73] Assignee: Astek Engineering, Inc., Watertown, Mass.

[21] Appl. No.: 142,047

[22] Filed: Apr. 21, 1980

[51] Int. Cl.³ .............................................. G01B 5/25
[52] U.S. Cl. ................................ 33/169 C; 33/185 R
[58] Field of Search ............... 33/169 C, 172, 185 R, 33/180 R, 174 Q, 191

[56] References Cited

U.S. PATENT DOCUMENTS

| | | | |
|---|---|---|---|
| 4,098,001 | 7/1978 | Watson | 33/169 C |
| 4,155,169 | 5/1979 | Drake et al. | 33/169 C |

OTHER PUBLICATIONS

Report #F657, "Using Compliance in Lieu of Sensory Feedback for Automatic Assembly", by S. H. Drake et al., S. Draper Lab. Inc., 9/77, pp. 121-137.
Brochure: Astek Eng. Inc., 5 Bridge St., Watertown, Mass., "Accommodator".

*Primary Examiner*—Harry N. Haroian
*Attorney, Agent, or Firm*—Cesari and McKenna

[57] ABSTRACT

A compliance element for a remote center compliance unit is formed from a multi-stranded cable having an elastomeric collar molded around a center portion thereof and terminating in threaded connectors for incorporation into the compliance unit.

5 Claims, 4 Drawing Figures

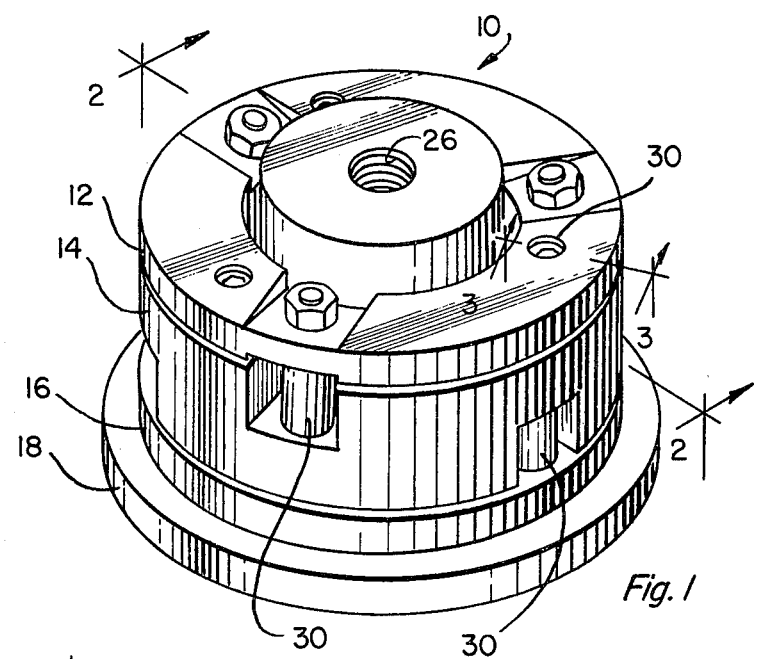
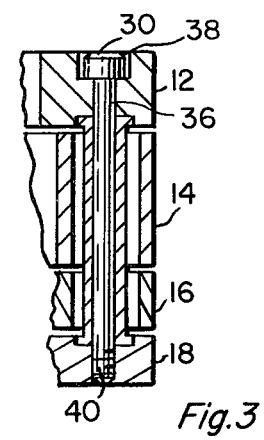
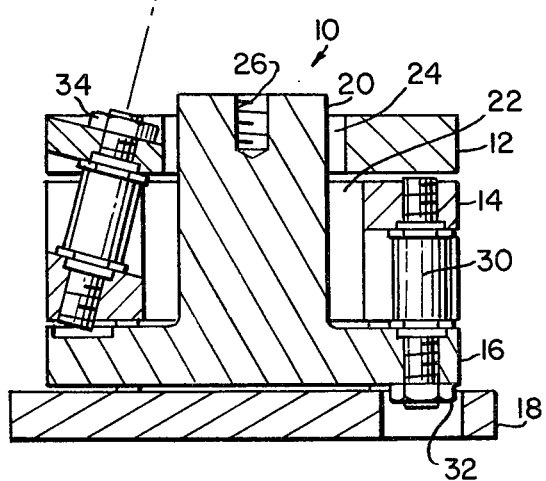
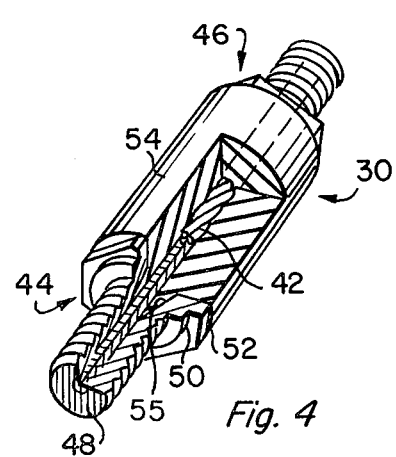
Fig. 1
Fig. 2
Fig. 3
Fig. 4

COMPLIANCE ELEMENT FOR REMOTE CENTER COMPLIANCE UNIT

BACKGROUND OF THE INVENTION

The invention relates to remote center compliance units and, more particularly, comprises an improved compliance element for such units.

Remote center compliance units provide a compliant interface between a machine and a part being assembled or otherwise manipulated. Compliance units typically hold an assembly part or tool and establish a center of compliance that usually lies at some distance beyond the unit itself, usually at the point where the part or tool held by the unit contacts the other part being assembled or worked upon. Lateral forces applied at this remote center appear as pure lateral movements in the compliance element; similarly, moments applied about the center of compliance appear as rotations of the compliance element about this center. Accordingly, small offsets or misorientations of the parts being manipulated or assembled are accomodated by the compliance unit and the assembly or other operation can proceed smoothly and without generating large counterforces that could otherwise result from misalignment.

Units of this kind are described in more detail in U.S. Pat. No. 4,155,169 entilted, "Compliant Assembly System Device", and issued May 22, 1979, to Samuel H. Drake and Sergio N. Simunovic and U.S. Pat. No. 4,098,001 entitled, "Remote Center Compliance System", issued July 4, 1978 to Paul C. Watson. These patents describe remote center compliance units utilizing a pair of platforms interconnected by a number of compliance elements. A remote center compliance unit utilizing three platforms interconnected in pairs by compliance elements is described in report number T-657, "Using Compliance in Lieu of Sensory Feedback for Automatic Assembly", by Samuel H. Drake, issued September 1977 by the C. S. Draper Laboratory, Inc. The compliance elements of the present invention are usable in both the two-platform and three-platform versions of compliance units described in these references, as well as in other kinds of compliance units as well.

BRIEF SUMMARY OF THE INVENTION

Accordingly, it is an object of the invention to provide an improved compliance element for remote center compliance units.

Further, it is an object of the invention to provide an improved compliance element whose design is capable of implementation over a wide range of compliance characteristics.

Still a further object of the invention is to provide an improved compliance element which can readily be utilized in a variety of compliance units of different design.

In accordance with the present invention, two or more platforms of a remote center compliance unit are interconnected by compliance elements in the form of a multi-stranded cable having connectors at both ends of the cable and an elastomeric collar molded around the center portion of the cable. The end connectors preferably have the form of a threaded rod flaring outwardly into an enlarged flange forming a concave mouth and having a bore through the center portion thereof and extending through the rod section. These connectors are seated on opposite ends of the cable with their concave sections facing each other, the cable extending through the connector bore. The concave faces of the flanges extend the effective length of the cable by allowing the cable to penetrate farther into the end connector before seating within the connector.

The cable is firmly attached to the end connectors by brazing, by soldering, by swedging, or by other well known joinder techniques. The elastomeric collar surrounding the mid-portion of the cable extends into the concave faces of the connector ends and is firmly seated there. For ease of connection, the rim of the flange of each connector preferably is formed in the shape of a hexagonal nut to facilitate attachment of the connector to the platforms. Further, immediately behind the hexagonal rim is preferably a stepped portion of smaller diameter, preferably circular, to aid in fitting the compliance element within the compliance unit.

The multi-stranded compliance element of the present invention provides a high tensile strength but at a low lateral stiffness, as compared to compliance elements previously utilized. Specifically, the tensile strength of each element of the cable is proportional to the square of the radius of each strand, while the stiffness of the cable is proportional to the fourth power of the radius of each strand. Thus, an extremely strong structure, with comparatively great compliance, can be obtained within a single compliance element.

The elastomeric material provides desirable restoring force and damping to the compliance elements and thereby facilitates and accelerates the assembly or other operation. Further, it provides additional structural strength to the cable. By jucicious choice of material, it also provides further facility to the designer in carefully controlling the compliance of each element for a given level of tensile strength.

DETAILED DESCRIPTION OF THE INVENTION

The foregoing and other and further features and objects of the invention will be more readily understood from the following detailed description of the invention, when taken in conjunction with the accompanying drawings, in which:

FIG. 1 is a view in perspective of a remote center compliance unit particularly suited for the compliance element of the present invention;

FIG. 2 is a sectional view along the lines 2—2 of FIG. 1, showing the compliance elements in more detail;

FIG. 3 is a partial, vertical view of the compliance unit of FIG. 1, showing attachment of the lower platform and machine interface plate thereof; and FIG. 4 is a pictorial view, partly in section, of the compliance element of the present invention.

In FIG. 1, a remote center compliance unit 10 has a bottom platform 12 (referred to the machine to which it is to be connected), an intermediate platform 14, a top platform 16, and a machine interface plate 18, all interconnected to form a single structural unit. As may be seen more clearly in FIG. 2, the top platform 16 carries an extrusion in the form of a shaft 20 which extends through bores 22, 24 in the intermediate and bottom platforms 14 and 12, respectively. A threaded bore 26 in the shaft 20 receives a machine tool or other element (not shown) which is to operate on a workpiece or to be assembled with it, as the case may be.

The intermediate unit 14 and the top unit 16 are interconnected by a plurality of compliance elements 30.

Preferably, there are three of these, evenly distributed about the elements 14, 16, that is, positioned 120 degrees from each other. Similarly, the bottom platform 12 and the intermediate platform 14 are interconnected by a like plurality of compliance elements 30. These also are preferably three in number, distributed about the periphery at 120 degree intervals. The elements 30 interconnecting the platforms 14 and 16 are screwed into the platform 14 at one end and are secured to the platform 16 by means of nuts 32. Similarly, the elements 30 interconnecting the platforms 12 and 14 are threadedly engaged in the platform 14 at one end and are secured to the platform 12 by means of nuts 34. Finally, the platform 12 is rigidly secured to the machine interface plate 18 by means of bolts 36 which sit in recessed wells 38 on platform 12 and are thready engaged in a threaded bore 40 on interface plate 18. These bolts likewise are preferably three in number, spaced around the periphery of the unit at 120 degree intervals. In use, the plate 32 is connected to the bottom of an assembly machine and the machine tool or other element hangs downwardly from it toward this workpiece being operated upon.

With the construction so far described, the platform 12 and machine interface plate 18 are rigidly affixed to each other and, for all practical purposes, neither rotate nor translate with respect to each other as the remote center compliance unit is being utilized. In contrast, however, the platforms 14 and 16, which are connected to the bottom plate 12 and to the machine interface plate 18, respectively, by the compliance elements 30, are capable of both translatory (i.e., transverse to the axis of shaft 20) and rotational motion with respect to the fixed elements 12 and 18 about an axis transverse to the axis of shaft 20. The orientation of the compliance elements 30 interconnecting the bottom platform and intermediate platform 14 establishes a remote center of compliance 41 at some distance outwardly of the bottom platform 12 but along the axis of shaft 20. For the compliance elements of the present invention and with their orientation as shown, this center will lie somewhat below the intersection of the axis of the elements 30 interconnecting platforms 12 and 14 and the axis of shaft 20. Preferably, this remote center is located at the point where the machine tool or other element connected to shaft 20 contacts the workpiece. With this location, lateral or rotational forces applied to the machine tool or work element will cause translatory motion of the platforms 14, 16 (and thus of the machine tool or work element) or will cause rotation of these platforms around the point 41, as the case may be. This allows the machine tool or work element to accomodate a slight misalignment with respect to the workpiece and thereby facilitates assembly or other work operation.

Turning now to FIG. 4, the compliance element of the present invention is shown in more detail. The element 30 has a multi-stranded cable 42 extending between end connectors 44, 46. The connector 44 comprises a threaded shank 48 extending at one end thereof outwardly into a flange in the form of a cylindrical ring 50 of somewhat larger diameter than the shank 48 and a hexagonal ring or nut 52 of somewhat larger diameter than the ring 50. The cable extends through a bore in the shank and is brazed, welded, or otherwise firmly joined to the end connector 44. The end connector 46 is constructed in similar manner and will not be further described.

Surrounding the cable, and preferably firmly bonded to it, is an elastomeric collar or plug 54. The collar or plug is generally cylindrical in shape, and extends between the flanges of the end connectors 44, 46 and preferably extends into the convex cavities 55 of these flanges for secure anchoring therein. The elastomeric collar serves several functions. Its primary function is to provide a restoring force and damping to the unit so that it quickly recovers from shocks induced by contact between the work piece and the tool or part that it carries, or from subtlerations or other such force-generating occurrences. Further, through proper choice of materials and proper dimensioning, it allows one to make fine modifications to the compliance of the element. Finally, it provides a certain amount of compressive, load-carrying ability in and of itself.

The dimensions of the compliance element, the type of elastomeric material, and similar specific characteristics will, of course, depend upon the application for which the compliance unit is being utilized. As an example of one system we have constructed, the compliance elements were formed from stranded, stainless steel cable, each strand of the cable being 0.093 inch in diameter, the cable being formed from seven groups having 19 strands in each group. The unit was approximately 1.4 inches long, from shank to shank, and the elastomeric collar was aproximately 0.4 inches in diameter. In a compliance element designed for use in a three-platform, remote center compliance unit, the compliance element has operated satisfactorily for a test cycle of over 1.5 million insertions in which a mis-match insertion of no less than 350 pounds was encountered on each insertion.

It will be understood that various changes and modifications may be made to the foregoing without departing from either the spirit or the scope of the invention and that the foregoing detailed description of the invention is intended to be taken as illustrative only, and not in a limiting sense, the precise scope of the invention being defined with particularity in the claims.

Having illustrated and described our invention, we claim:

1. In a remote center compliance unit having at least first and second platforms interconnected by a plurality of compliance elements, the improvement wherein each said element comprises a multi-stranded cable enclosed within an elastomeric plug.

2. A remote center compliance unit in accordance with claim 1 in which said each said compliance element includes a collar at each end of said cable and snugly connected thereto, and means for fastening said collars to respective ones of said platforms.

3. A remote center compliance unit in accordance with claim 2 in which each said collar includes an outwardly extending flange enclosing said elastomeric material between itself and a corresponding flange.

4. A remote center compliance unit in accordance with claim 2 in which each said collar comprises an outwardly extending flange having a recessed inner face concave to the mid-portion of said cable, and a threaded shank for fastening to said platforms.

5. A remote center compliance unit according to claim 4 in which said elastomeric material is molded around said cable and penetrates the concave faces of said flange.

* * * * *